| (12) United States Patent<br>Tsai et al. | (10) Patent No.: US 7,781,116 B2<br>(45) Date of Patent: Aug. 24, 2010 |
|---|---|

(54) APPARATUS FOR THERMAL SIMULATION OF FUEL CELL

(75) Inventors: Yu-Ching Tsai, Donggang Township, Pingtung County (TW); Yau-Pin Chyou, Taipei (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 1151 days.

(21) Appl. No.: 11/328,137

(22) Filed: Jan. 10, 2006

(65) Prior Publication Data

US 2007/0128487 A1 Jun. 7, 2007

(30) Foreign Application Priority Data

Nov. 23, 2005 (TW) .............................. 94141187 A

(51) Int. Cl.
*H01M 8/04* (2006.01)
*F23L 9/00* (2006.01)
(52) U.S. Cl. ...................................... 429/441; 431/190

(58) Field of Classification Search .................. 429/26, 429/21, 13, 17, 38, 420; 60/780; 431/190
See application file for complete search history.

(56) References Cited

U.S. PATENT DOCUMENTS

| 4,696,871 A * | 9/1987 | Pinto ............................ 429/17 |
| 4,943,493 A * | 7/1990 | Vartanian ....................... 429/17 |
| 5,366,819 A * | 11/1994 | Hartvigsen et al. ............. 429/17 |
| 6,794,072 B2 * | 9/2004 | Okamoto ....................... 429/24 |
| 2002/0174659 A1 * | 11/2002 | Viteri et al. .................... 60/780 |
| 2003/0175565 A1 * | 9/2003 | Noda ........................... 429/21 |
| 2004/0062956 A1 * | 4/2004 | Goebel et al. ................. 429/13 |
| 2004/0191588 A1 * | 9/2004 | Eshraghi et al. ............... 429/19 |
| 2005/0079401 A1 * | 4/2005 | Park ............................ 429/38 |

* cited by examiner

*Primary Examiner*—Jonathan Crepeau
*Assistant Examiner*—Kenneth Douyette
(74) *Attorney, Agent, or Firm*—Jackson IPG PLLC; Demian K. Jackson

(57) ABSTRACT

The present invention is a simulator used in initial system integration tests of a SOFC to test peripheral components with saved costs by replacing the costly SOFC with the simulator.

4 Claims, 6 Drawing Sheets

APPARATUS FOR THERMAL SIMULATION OF FUEL CELL

FIELD OF THE INVENTION

The present invention relates to a thermal simulation apparatus; more particularly, relates to running initial system integration tests of a solid oxide fuel cell (SOFC) with reduced cost by replacing the SOFC with the apparatus.

DESCRIPTION OF THE RELATED ART

As the price of energy is getting higher, energy expense has become a big issue in the world nowadays. Methods for improving energy utilization efficiency are surely the most instant solutions. As is well-known, a fuel cell generates electric power through electrochemical reaction of hydrogen and oxygen, whose power-generating efficiency possesses high potential to all kinds of power-generating technology, from a small electric power used in 3C products to a megawatt-scaled electric power produced by a power plant. Among all kinds of fuel cells, SOFC shows the best efficiency. Yet, since it is run under a high temperature and the exhaust gas it produces is of high temperature too, it requires the most challenging technology among the fuel cells as well. And, as it is run under a temperature between 600 to 1000° C., the performance parameters of the coordinated peripheral components, such as a reformer, a sequential burner and heat exchangers, have to be carefully considered for a successful thermal system integration of fuel cell. In another word, it is truly a prerequisite to the peripheral components that they must be able to sustain high-temperature operations. Hence, an integration examination of a SOFC not only requires a complete matching analysis; but also a down-to-earth experiment is essential.

A disposition of a complete SOFC system of a prior art, as shown in FIG. 6, comprises a SOFC 8; a heat exchanger for air flow 80 connecting to the SOFC 8; a sequential burner 81 connecting to the SOFC while having a fuel flow for start-up 811; an air compressor 82 compressing air 83 to supply an air for start-up 821 to the heat exchanger for airflow 80 and the sequential burner 81; a steam generator 84 connecting to the heat exchanger for air flow 80; a water tank 85 supplying water to the steam generator 84 by using a water pump 86; a heat exchanger for mixing gas 87 connecting respectively to the SOFC 8, the heat exchanger for air flow 80 and the sequential burner 81, coordinated with a reformer 871; a fuel/steam mixer 88 connecting to the steam generator 84 and the heat exchanger for mixing g as 87 and connecting to a fuel heater 881 supplying a fuel 883 by using a fuel pump 882.

Nevertheless, a SOFC costs high and its structure is not strong, even weak with its main body, it does not sustain a severe operation or environment. Obviously, owing to its high cost, when the environment has a somewhat big change, a high loss might happen, which is not suitable in initial system integration tests. Hence, the prior art does not fulfill users' requests on actual use.

SUMMARY OF THE INVENTION

The main purpose of the present invention is to test a sequential burner, a heat exchanger and/or other component by using a pre-heater and a simulation burner coordinated with a steam boiler, an air compressor, a gas supplier, a mixer and a reformer, where a SOFC is replaced to save cost when running initial system integration tests of the SOFC.

To achieve the above purpose, the present invention is an apparatus for a thermal simulation of fuel cell, comprising a pre-heater heating an air flow passing by; and a simulation burner respectively located at an end of the pre-heater burning a fuel to raise the temperature of the air flow and to obtain another air flow having required components, coordinated with a steam boiler, an air compressor, a gas supplier, a mixer and a reformer, where a sequential burner, a heat exchanger or other component is tested. Accordingly, a novel apparatus for a thermal simulation of fuel cell is obtained.

BRIEF DESCRIPTIONS OF THE DRAWINGS

The present invention will be better understood from the following detailed descriptions of the preferred embodiments according to the present invention, taken in conjunction with the accompanying drawings, in which FIG. 1 is an explosive view showing a fundamental structure of a first preferred embodiment according to the present invention;

DESCRIPTION OF THE PREFERRED EMBODIMENTS

The following description of the preferred embodiments are provided to understand the features and the structures of the present invention.

Figure 1:
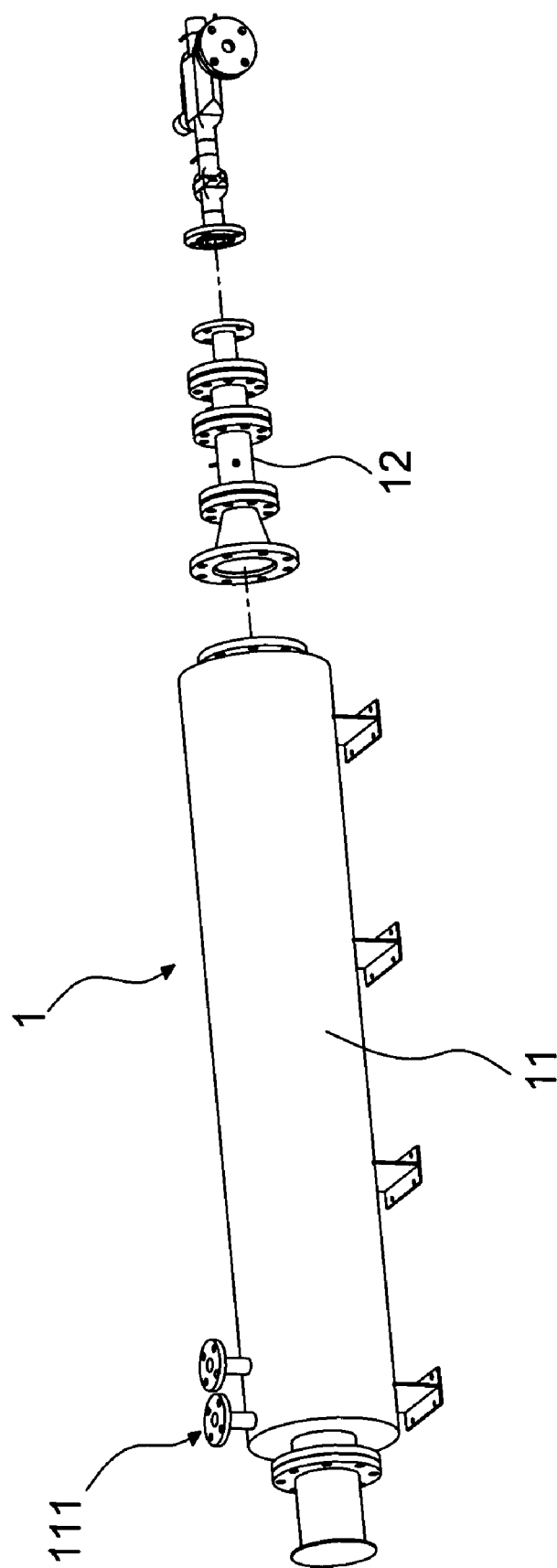

Please refer to FIG. 1, which is an explosive view showing a fundamental structure of a first preferred embodiment according to the present invention. As shown in the FIG. 1, the present invention is an apparatus for a thermal simulation of fuel cell, where a thermal simulator 1 comprises a pre-heater 11 and a simulation burner 12; and the thermal simulator 1 plays a role as a solid oxide fuel cell (SOFC) where a component is tested with saved costs in initial system integration tests of the SOFC.

The pre-heater 11 heats an air flow passing by until a predestined temperature between 400 and 600° C. (Celsius degree) to supply heat so that a required temperature is obtained at an end of the simulation burner 12; the pre-heater 11 heats the air flow with an electric heater; and a plurality of inlet pipes 111 are deposed on the pre-heater 11.

The simulation burner 12 is located at an end of the pre-heater 11 to produce an air flow simulating which is outputted from a sequential burner, a heat exchanger or other component; and the simulation burner 12 raises temperature of the air flow by burning a fuel.

Figure 2:
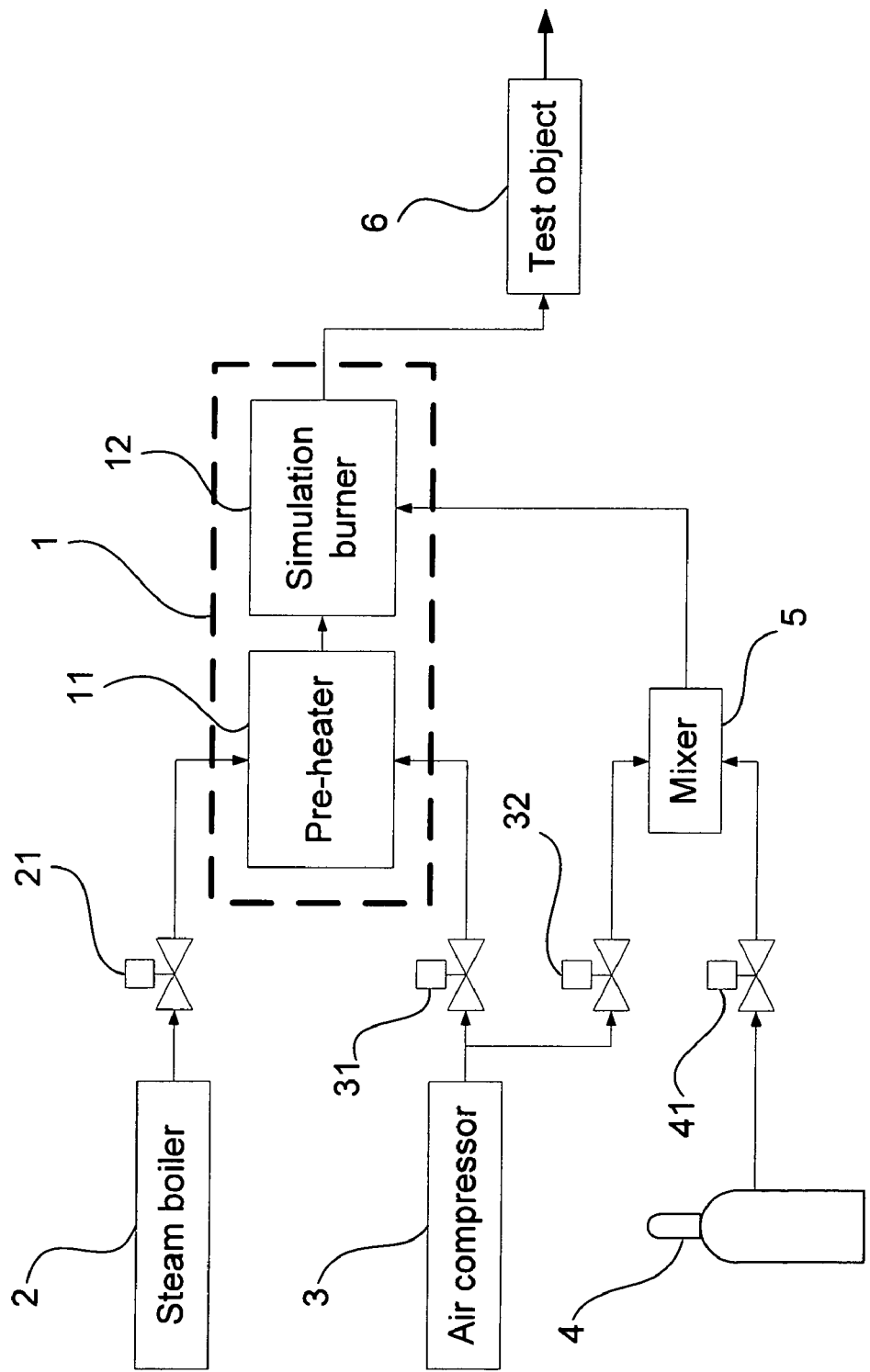
FIG. 2 is a block view showing a flow chart according to a second preferred embodiment of the present invention.

Please refer to FIG. 2, which is a block view showing a flow chart according to a second preferred embodiment of the present invention. As shown in the figure, when using the present invention, a test object 6 of a heat exchanger is tested by using a thermal simulator 1 comprising a pre-heater 11 and a simulation burner, coordinated with a steam boiler 2, an air compressor 3, a gas supplier 4 and a mixer 5.

The pre-heater 11 heats an air flow passing by until a predestined temperature between 400 and 600° C. to supply heat so that a required temperature is obtained at an end of the simulation burner 12.

The simulation burner 12 is located at an end of the pre-heater 11 to produce an air flow simulating which is outputted from a heat exchanger; and the simulation burner 12 raises temperature of the air flow by burning a fuel.

The steam boiler 2 is connected with the pre-heater 11 to provide a required steam flow for the thermal simulator 1 so that a steam amount at an output of a heat exchanger is simulated; and a mass flow controller (MFC) 21 is located between the steam boiler 2 and the pre-heater 11.

The air compressor 3 is connected with the pre-heater 11 to provide required compressed air; and an MFC 31 is located between the air compressor 3 and the pre-heater 11.

The gas supplier 4 is connected with the simulation burner 12; the gas supplier 4 is a steel cylinder to provide a methane ($CH_4$) or a natural gas; and an MFC 41 is located between the gas supplier 4 and the simulation burner 12.

The mixer 5 is connected to the gas supplier 4, the air compressor 3 and the simulation burner to mix airs; and an MFC 32 is located between the air compressor 3 and the mixer 5.

The test object 6 is connected with the simulation burner 12.

In the second preferred embodiment here, the test object 6 is a heat exchanger located down stream to the simulation burner 12 to recycle the thermal energy at an output of the simulation burner 12. Hence, the performance of the test object 6 is tested with the simulation burner 12 by simulating the gas outputted from a sequential burner. Because the output gas from a sequential burner is the same as that from burning a methane in air (only where the air is excessively supplied) yet the temperature obtained is higher than that obtained from purely burning the methane in air (which is a characteristic of SOFC), heat is supplied by using the pre-heater 11 to obtain required temperature when a sequential burner is simulated with the simulation burner 12.

Figure 3:
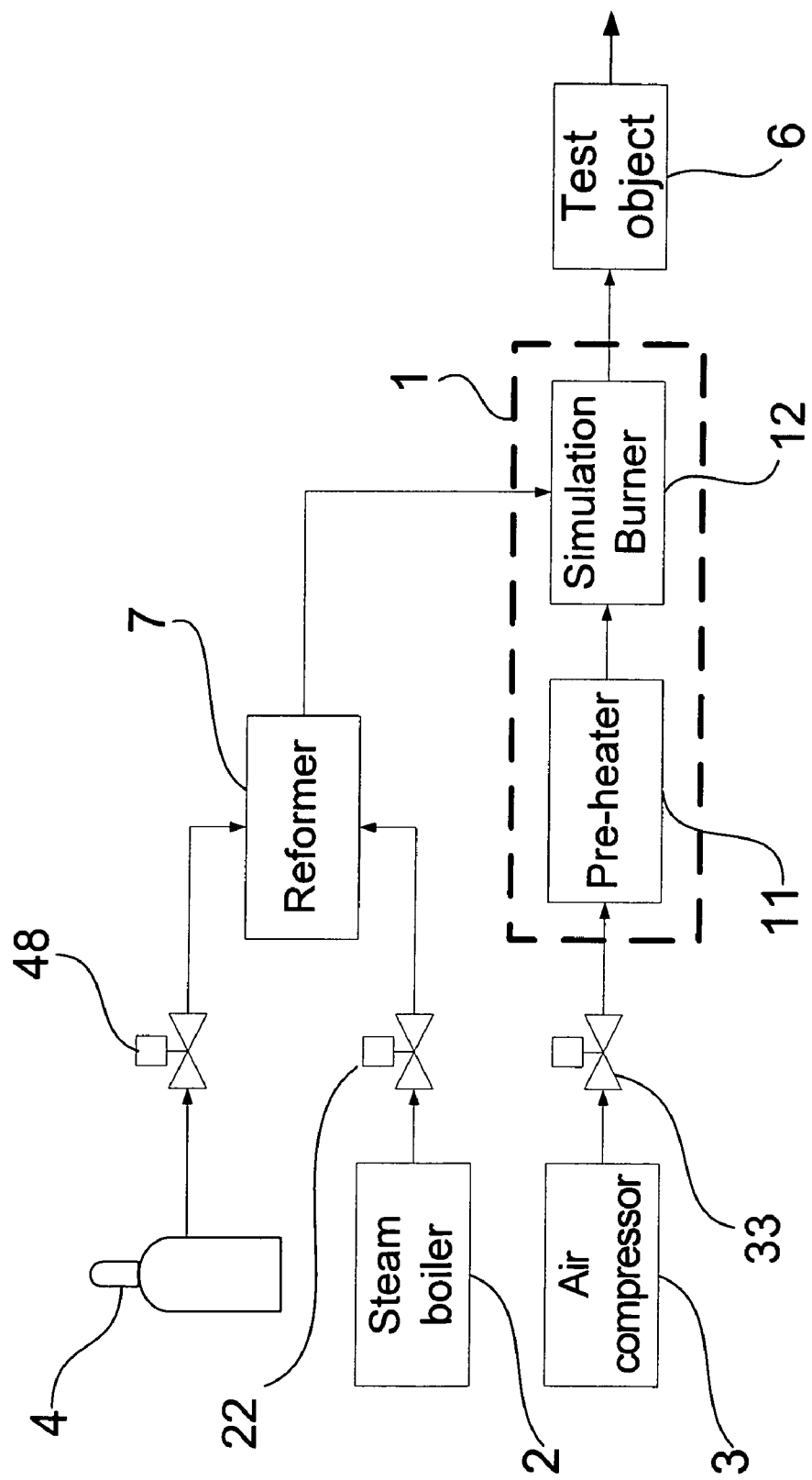
FIG. 3 is a block view showing a flow chart according to a third preferred embodiment of the present invention.

Please refer to FIG. 3, which is a block view showing a flow chart according to a third preferred embodiment of the present invention. As shown in the figure, when using the present invention, a test object 6 other than a sequential burner, such as a heat exchanger, is tested by using a thermal simulator 1 comprising a pre-heater 11 and a simulation burner, coordinated with a reformer 7, a steam boiler 2, an air compressor 3 and a gas supplier 4.

The pre-heater 11 heats an air flow passing by until a predestined temperature between 400 and 600° C. to supply heat so that a required temperature is obtained at an end of the simulation burner 12.

The simulation burner 12 is located at an end of the pre-heater 11 to produce an air flow simulating which is outputted from a component other than a sequential burner, such as a heat exchanger; and the simulation burner 12 raises temperature of the air flow by burning a fuel.

The reformer 7 is connected with the first simulation burner 12 to reform a hydrocarbon fuel to be rich in hydrogen.

The steam boiler 2 is connected with the reformer 7 to provide a required steam flow for the reformer 7; and an MFC 22 is located between the steam boiler 2 and the reformer 7.

The gas supplier 4 is connected with the reformer 7; the gas supplier 4 is a steel cylinder to provide a methane or a natural gas; and an MFC 48 is located between the gas supplier 4 and the reformer 7.

The air compressor 3 is connected with the pre-heater 11 to provide required compressed air; and an MFC 33 is located between the air compressor 3 and the pre-heater 11.

The test object 6 is connected with the simulation burner 12.

The third preferred embodiment can be regarded as an extension of the second preferred embodiment, where a fuel flow and a steam flow are supplied by a reformer 7. Thus, a component other than a sequential burner can be tested.

Figure 4:
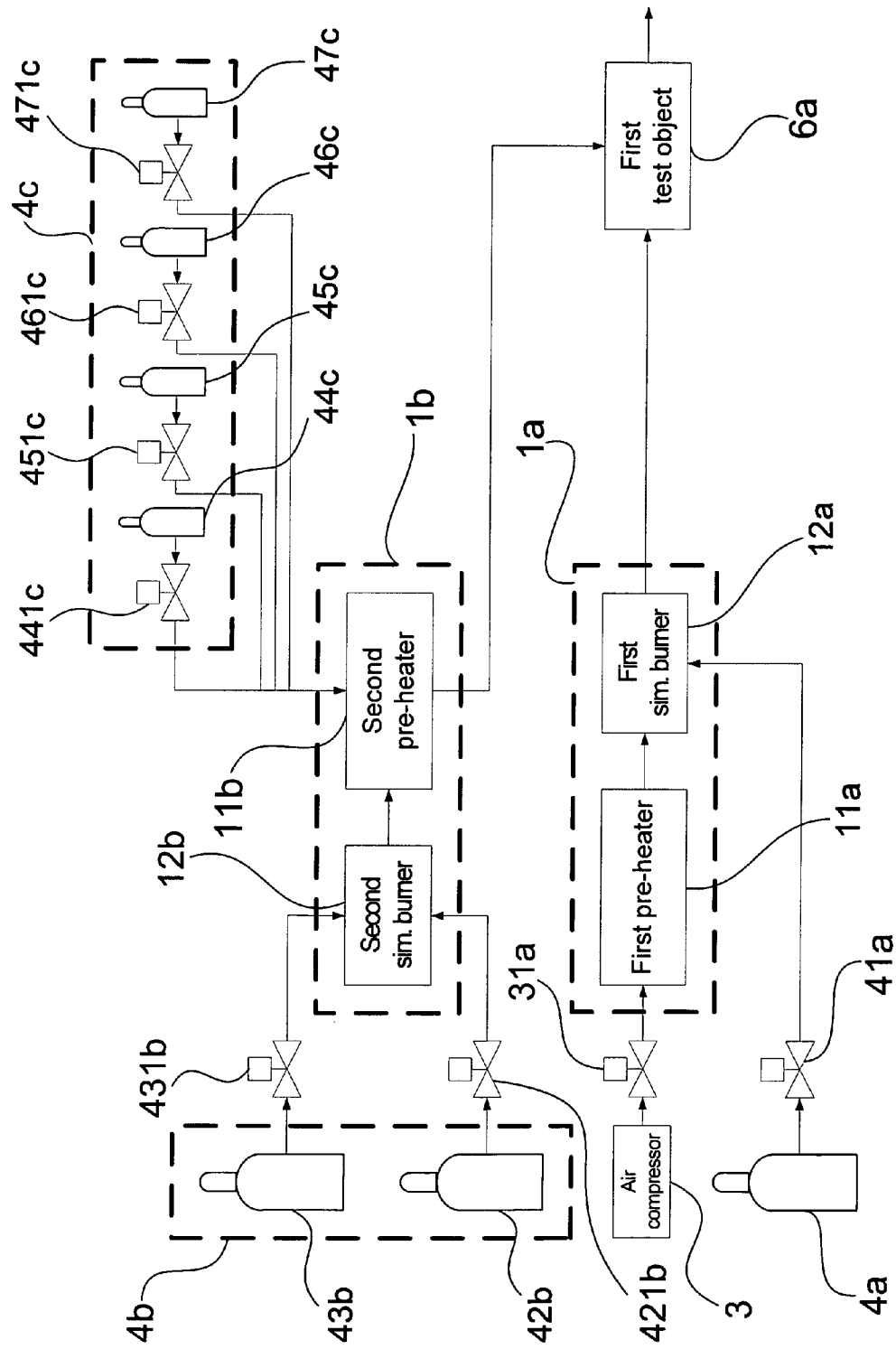
FIG. 4 is a block view showing a flow chart according to a fourth preferred embodiment of the present invention.

Please refer to FIG. 4, which is a block view showing a flow chart according to a fourth preferred embodiment of the present invention. As shown in the figure, a first test object 6a of a sequential burner is tested by using a first thermal simulator 1a, comprising a first pre-heater 11a and a first simulation burner 12a, and a second thermal simulator 1b, comprising a second pre-heater 11b and a second simulation burner 12b, coordinated with an air compressor 3, a first gas supplier 4a, a second gas supplier 4b and a third gas supplier 4c.

The first pre-heater 11a and the second pre-heater 11b heat a first and a second air flows passing by to a predestined temperature between 400 and 600° C. to supply heat so that a required temperature is obtained at each end of the first simulation burner 12a and the second simulation burner 12b respectively.

The first simulation burner 12a is located at an end of the first pre-heater 11a to produce a first air flow simulating which is outputted from a cathode of a SOFC and the first simulation burner 12a raises temperature of the first air flow by burning a fuel.

The second simulation burner 12b is located at an end of the second pre-heater 11b to produce a second air flow simulating which is outputted from an anode of the SOFC; and the second simulation burner 12b raises temperature of the second air flow by burning a fuel.

The air compressor 3 is connected with the first pre-heater 11a to provide required compressed air; and an MFC 31a is located between the air compressor 3 and the first pre-heater 11a.

The first gas supplier 4a is connected with the first simulation burner 12a; the first gas supplier 4a is a steel cylinder to provide a methane or hydrogen ($H_2$); and an MFC 41a is located between the first gas supplier 4a and the first simulation burner 12a.

The second gas supplier 4a is connected with the second simulation burner 12a; the second gas supplier 4a comprises steel cylinders 42b, 43b to provide hydrogen ($H_2$) and oxygen ($O_2$); and an MFC 421b, 431b is located between each steel cylinder 42b, 43b and the second simulation burner 12b.

The third gas supplier 4c is connected with the second pre-heater 11b; the third gas supplier 4c comprises steel cylinders 44c, 45c, 46c, 47c to provide a methane, hydrogen, carbon monoxide (CO) and carbon dioxide ($CO_2$); and an MFC 441c, 451c, 461c, 471c is located between each steel cylinder 44c, 45c, 46c, 47c and the second pre-heater 11b.

The first test object 6a is connected with the first simulation burner 12a and the second pre-heater 11b.

The output at a cathode of the SOFC is an air with high temperature, which comprises less oxygen than regular air after passing through an anode and a solid electrolyte. Therefore, when the first thermal simulator 1a is used to simulate the cathode of the SOFC, some oxygen in the air is consumed by a burning with some adequate fuel added to the first simulation burner 12a so that a required oxygen amount in the output of the cathode of the SOFC is simulated. Although the burning produces $CO_2$ and $H_2O$, their amounts are so tiny that they almost do nothing to the sequential burner. Besides, the temperature of the air is also raised by the burning so that the power required by the first pre-heater 11a is reduced. Regarding the output air at the anode of the SOFC, the output air may comprises $H_2$, $CH_4$, CO, $CO_2$ and $H_2O$, where $H_2O$ takes the most part, and $H_2$ and $CO_2$ follows. Thus, a second thermal simulator 1b is used to simulate the cathode of the SOFC by a burning of $H_2$ and $O_2$ in the second thermal simulator 1b so that a required amount of $H_2O$ is obtained and the power required by the second pre-heater 1b is reduced. The other components of the fuel are sent to the second pre-heater 11b through the MFCs 441c, 451c, 461c, 471c of the third gas supplier 4c to be mixed with the output air flow from the second simulation burner. Thus, the output air at the anode of the SOFC is obtained.

Figure 5:
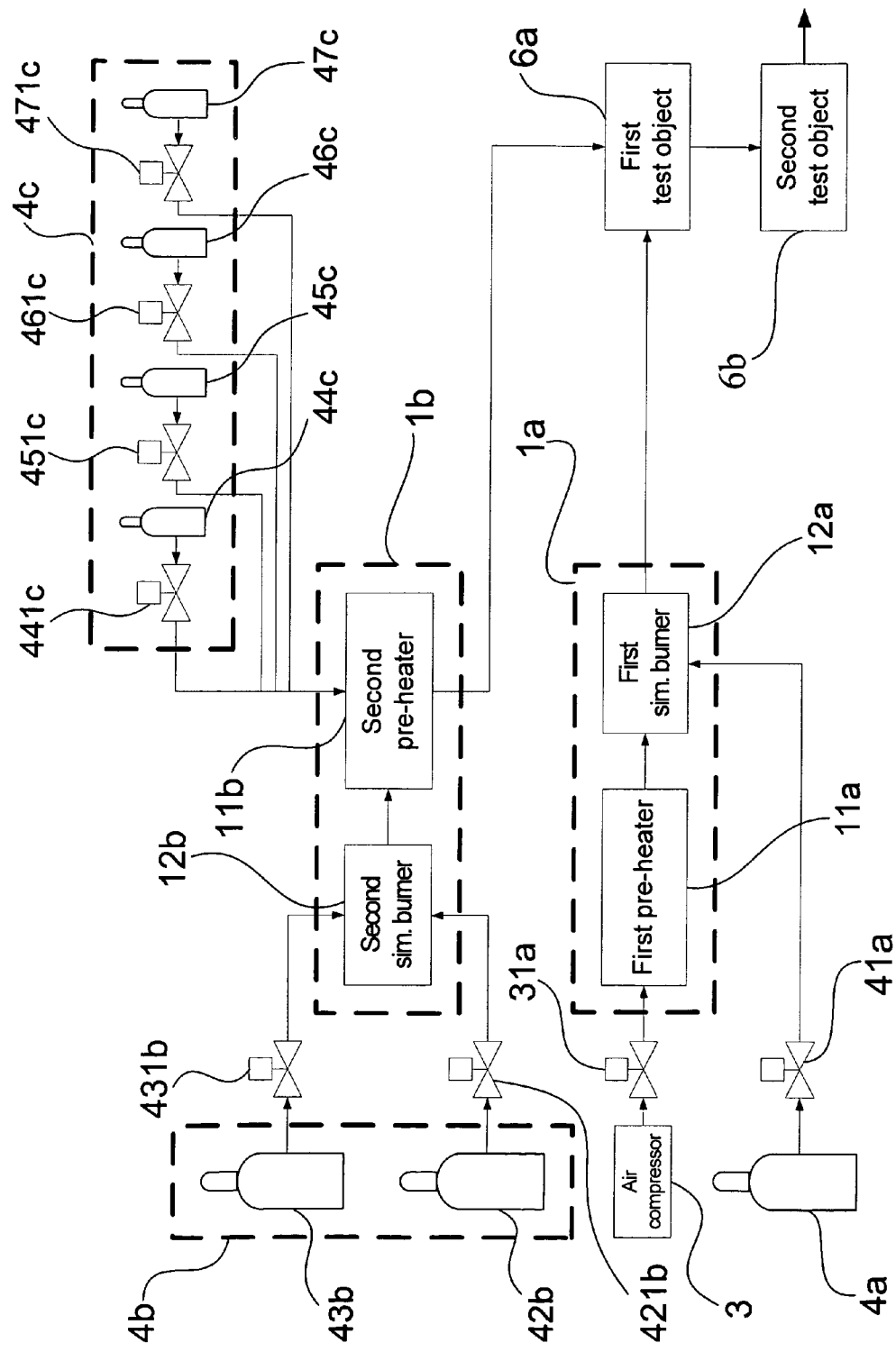
FIG. 5 is a block view showing a flow chart according to a fifth preferred embodiment of the present invention.
Figure 6:
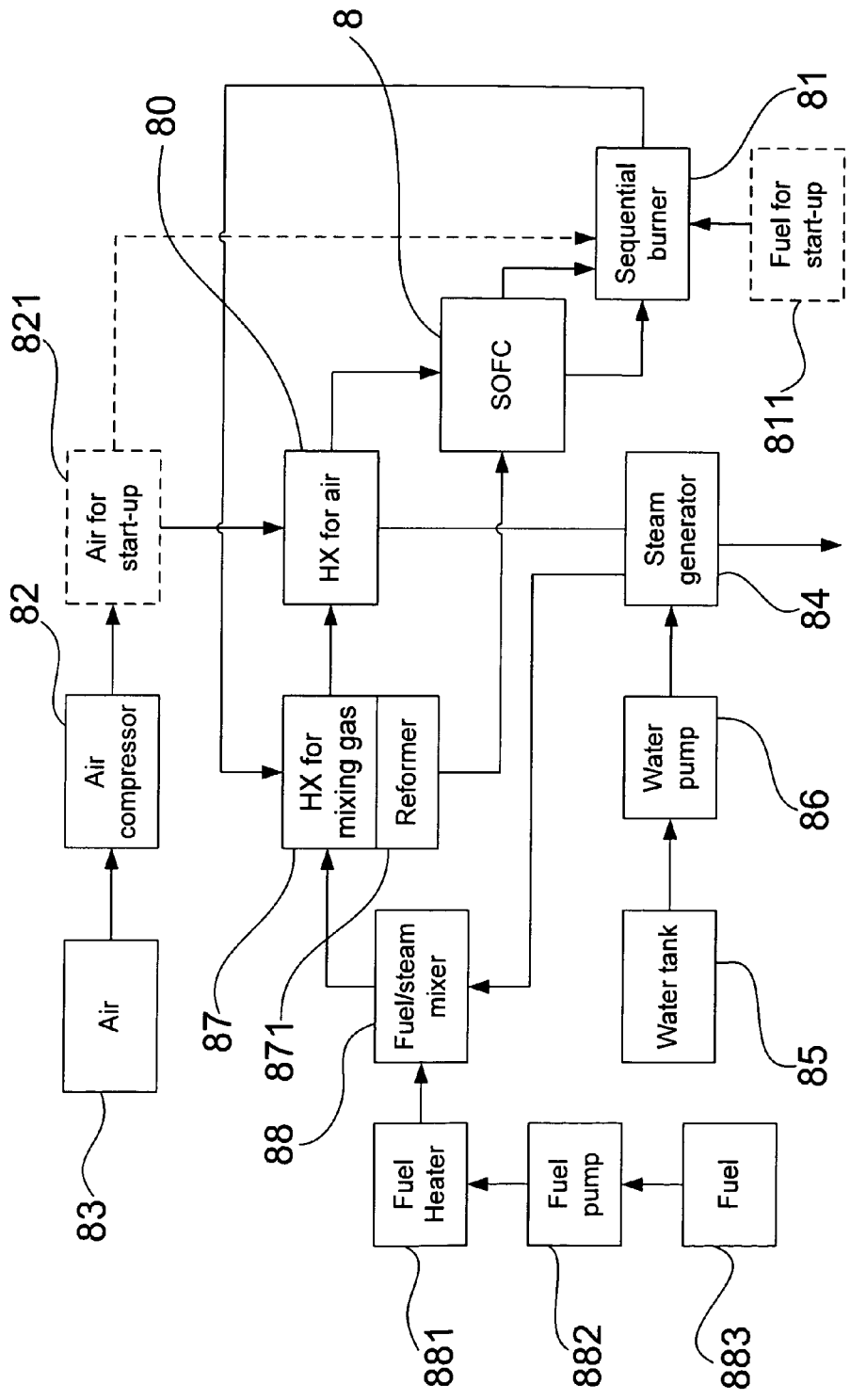
FIG. 6 is a disposition block view of a prior art.

Please further refer to FIG. 5, which is a block view showing a flow chart according to a fifth preferred embodiment of the present invention. As shown in the figure, two connected test objects are located downstream to the first simulation burner 12a, which comprises a first test object 6a of a sequential burner and a second test object 6b of a heat exchanger. By doing so, the first test object 6a and the second test object 6b are tested simultaneously.

To sum up, the present invention is an apparatus for a thermal simulation of fuel cell, where a sequential burner, a heat exchanger or other component is tested by using a pre-heater and a simulation burner coordinated with a steam boiler, an air compressor, a gas supplier, a mixer and a reformer. Consequently, a SOFC can be replaced with the apparatus when running initial system integration tests of the SOFC.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. An apparatus for providing a thermal simulation of a fuel cell, the apparatus lacking a fuel cell and comprising:
   (a) a pre-heater heating a first gas flow comprising steam and compressed air to a temperature of 400 to 600° C.;
   (b) a simulation burner located at an end of said pre-heater to further raise the temperature of said first gas flow by burning a fuel and to obtain a second gas flow having a predestined composition;
   (c) a steam boiler connecting to said pre-heater to provide the steam flow;
   (d) an air compressor connecting to said pre-heater to provide the compressed air;
   (e) a gas supplier providing the fuel;
   (f) a mixer connecting to said gas supplier, said air compressor and said simulation burner, said mixer mixing gases from said gas supplier and said air compressor and providing said mixed fuel and compressed air to said simulation burner; and
   (g) a test object connecting downstream to said simulation burner, wherein the test object recycles thermal energy output from the simulation burner and wherein the simulation burner outputs the second gas flow wherein the predestined composition is the same, however at an elevated temperature, as would otherwise be obtained from burning the fuel in air so as to simulate characteristics of gas output from a sequential burner.

2. The apparatus according to claim 1, wherein said gas supplier comprises a steel cylinder providing a gas selected from a group consisting of a methane (CH4) and a natural gas.

3. The apparatus according to claim 1, wherein said test object is a heat exchanger.

4. The apparatus according to claim 1,
   wherein a mass flow controller (MFC) is located between said steam boiler and said pre-heater;
   wherein an MFC is located between said air compressor and said pre-heater;
   wherein an MFC is located between said air compressor and said mixer; and
   wherein an MFC is located between said gas supplier and said mixer.

* * * * *